(12) United States Patent
Pejathaya (10) Patent No.: US 6,634,714 B1
(45) Date of Patent: Oct. 21, 2003

(54) SLIDING PIN SEAT HINGE ASSEMBLY

(75) Inventor: Srinivas Pejathaya, St. Clair Shores, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 09/963,215

(22) Filed: Sep. 26, 2001

(51) Int. Cl.⁷ .................................................. B60N 2/02
(52) U.S. Cl. ........................... 297/378.12; 297/378.14; 297/367
(58) Field of Search ..................... 297/367, 378.12, 297/378.14

(56) References Cited

U.S. PATENT DOCUMENTS

| | | | | |
|---|---|---|---|---|
| 3,262,737 A | * | 7/1966 | Martens .................. | 297/378.12 |
| 4,103,967 A | * | 8/1978 | Tanaka et al. .......... | 297/378.11 |
| 4,219,234 A | * | 8/1980 | Bell ........................... | 297/374 |
| 4,484,779 A | * | 11/1984 | Suzuki ....................... | 297/326 |
| 4,720,145 A | * | 1/1988 | Bell ....................... | 297/378.11 |
| 5,810,444 A | * | 9/1998 | Refior et al. ........... | 297/378.12 |
| 6,161,899 A | * | 12/2000 | Yu .......................... | 297/378.12 |
| 6,290,297 B1 | * | 9/2001 | Yu .......................... | 297/378.12 |
| 6,454,355 B2 | * | 9/2002 | Biletskiy ............... | 297/378.12 |
| 6,533,357 B2 | * | 3/2003 | Pospheshil et al. .... | 297/378.14 |

FOREIGN PATENT DOCUMENTS

JP              05003813 A    *  1/1993

\* cited by examiner

Primary Examiner—Peter M. Cuomo
Assistant Examiner—Joseph Edell
(74) Attorney, Agent, or Firm—Harness, Dickey & Pierce, P.L.C.

(57) ABSTRACT

A seat hinge assembly is provided and includes a support rotatably supporting an arm and further supporting a locking arrangement for locking the arm in either an upright or forward fold position. The locking arrangement includes a lock-pin slidably supported by the support and a cam for selectively interfacing the lock-pin. The locking arrangement further includes a pair of lock plates rotatably supported by the support and in selective engagement with the lock-pin. The lock plates slidably support a stop pin that is concurrently slidable within the support. The lock-pin is engageable with the arm for locking the arm in an upright position and the stop pin is engageable with the arm for locking the arm in a fold position.

28 Claims, 6 Drawing Sheets

SLIDING PIN SEAT HINGE ASSEMBLY

FIELD OF THE INVENTION

The present invention relates to seat hinge assemblies and more particularly to an improved sliding pin seat hinge assembly.

SUMMARY OF THE INVENTION

A seat hinge assembly provides and includes a support, an arm pivotally supported by the support, a lock plate pivotally supported by the support, a lock pin slidably supported by the support and interfacing the lock plate, a stop pin concurrently supported by the support and the lock plate and a cam pivotally supported by the support and slidably interfacing the lock-pin. The lock-pin selectively locks the arm in a first position relative to the support and a coil spring and the stop pin selectively lock the arm in a second position relative to the support.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
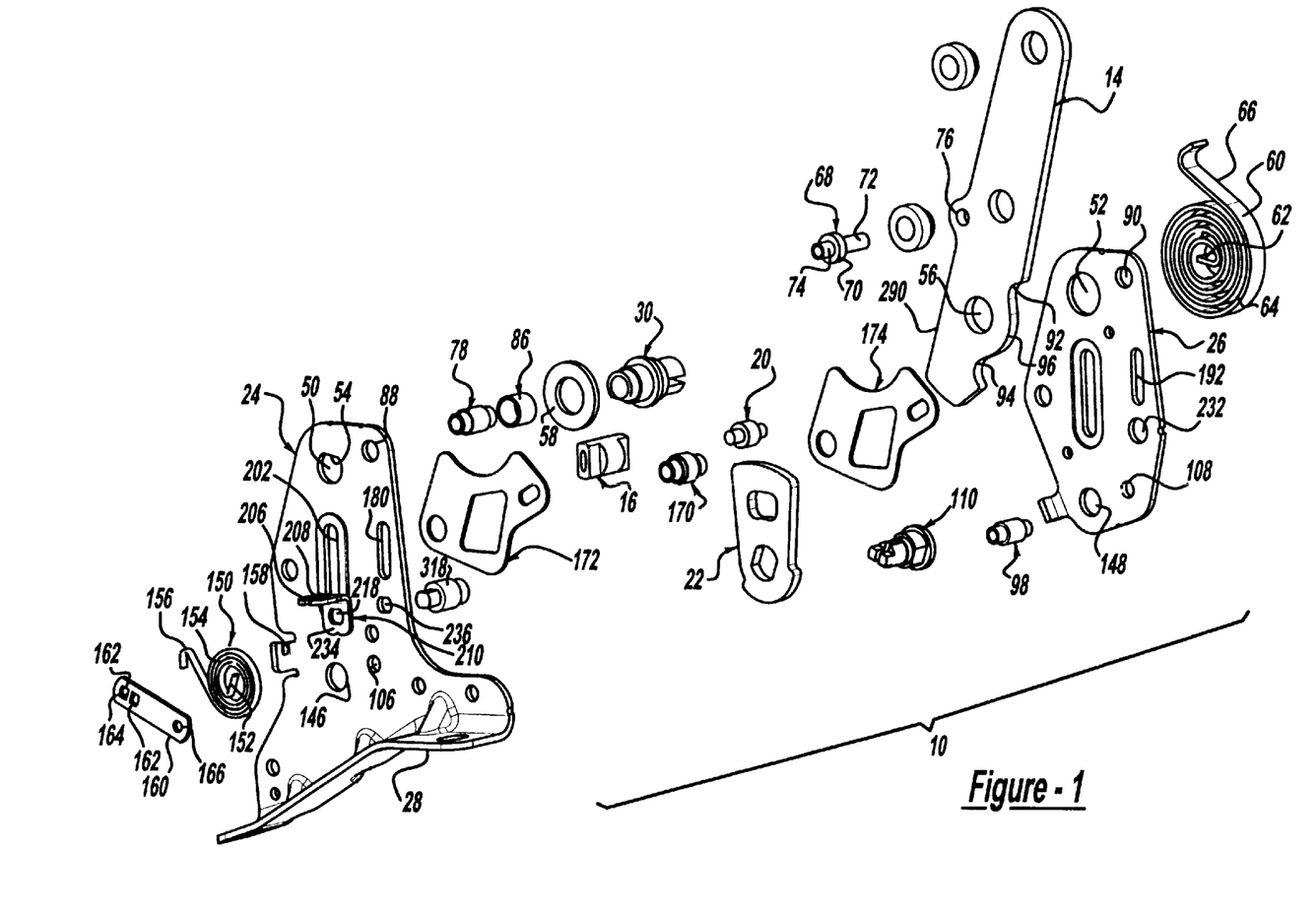
FIG. 1 is an exploded perspective view of a seat hinge assembly according to the principles of the present invention.
Figure 1A:
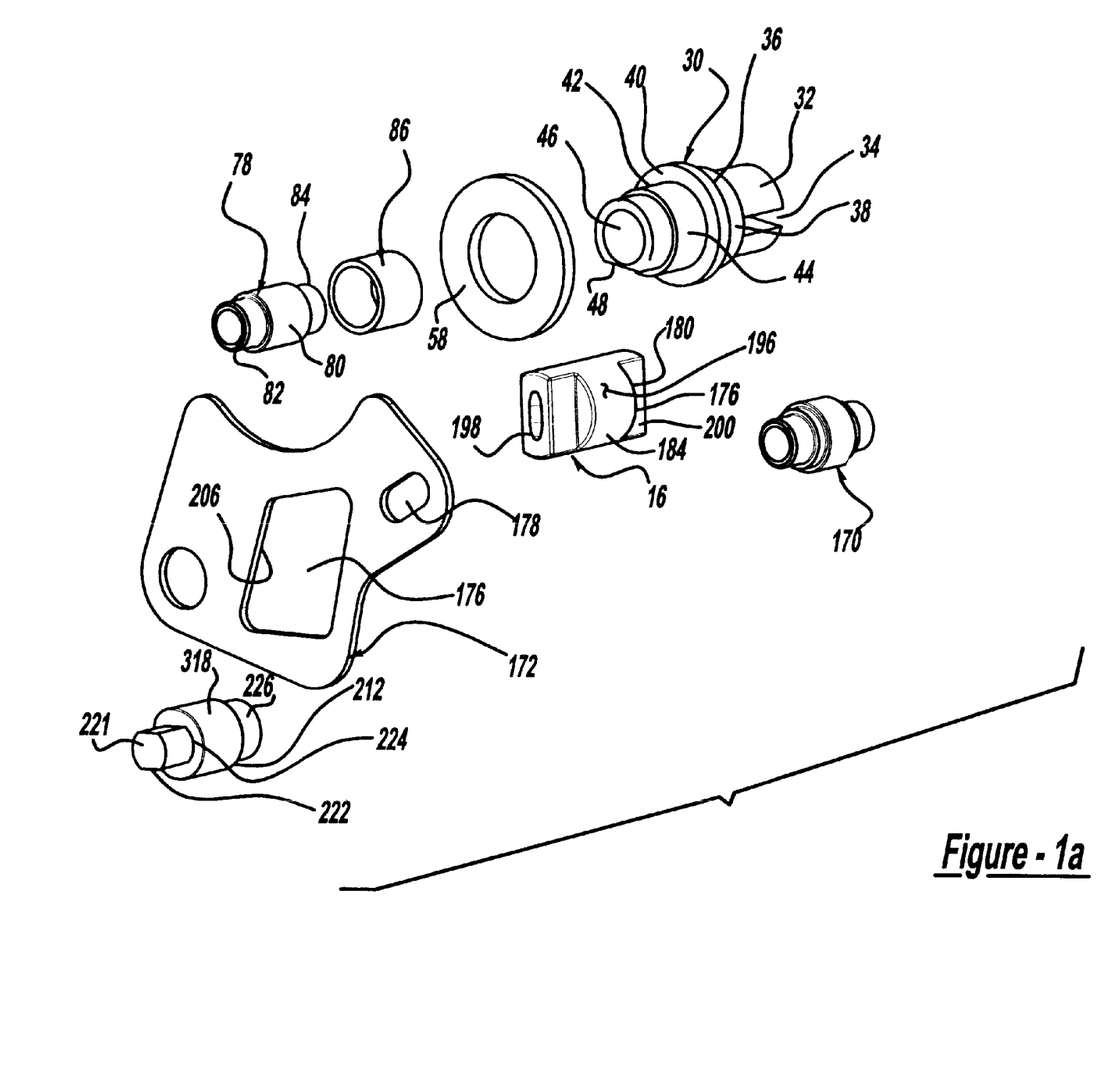
FIG. 1a is an exploded perspective view of a portion of the seat hinge assembly of FIG. 1.
Figure 1B:
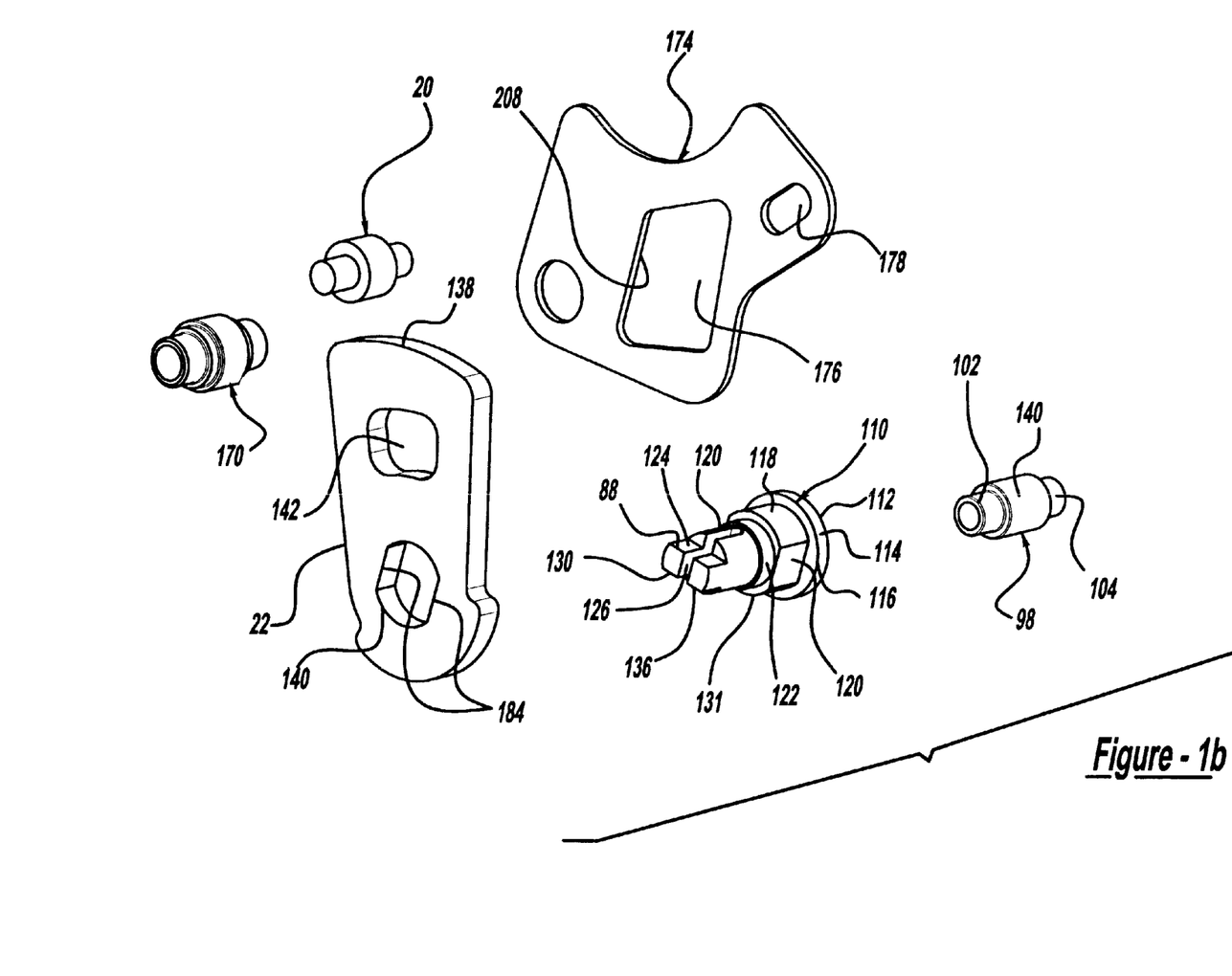
FIG. 1b is an exploded perspective view of another portion of the seat hinge assembly of FIG. 1.
Figure 2:
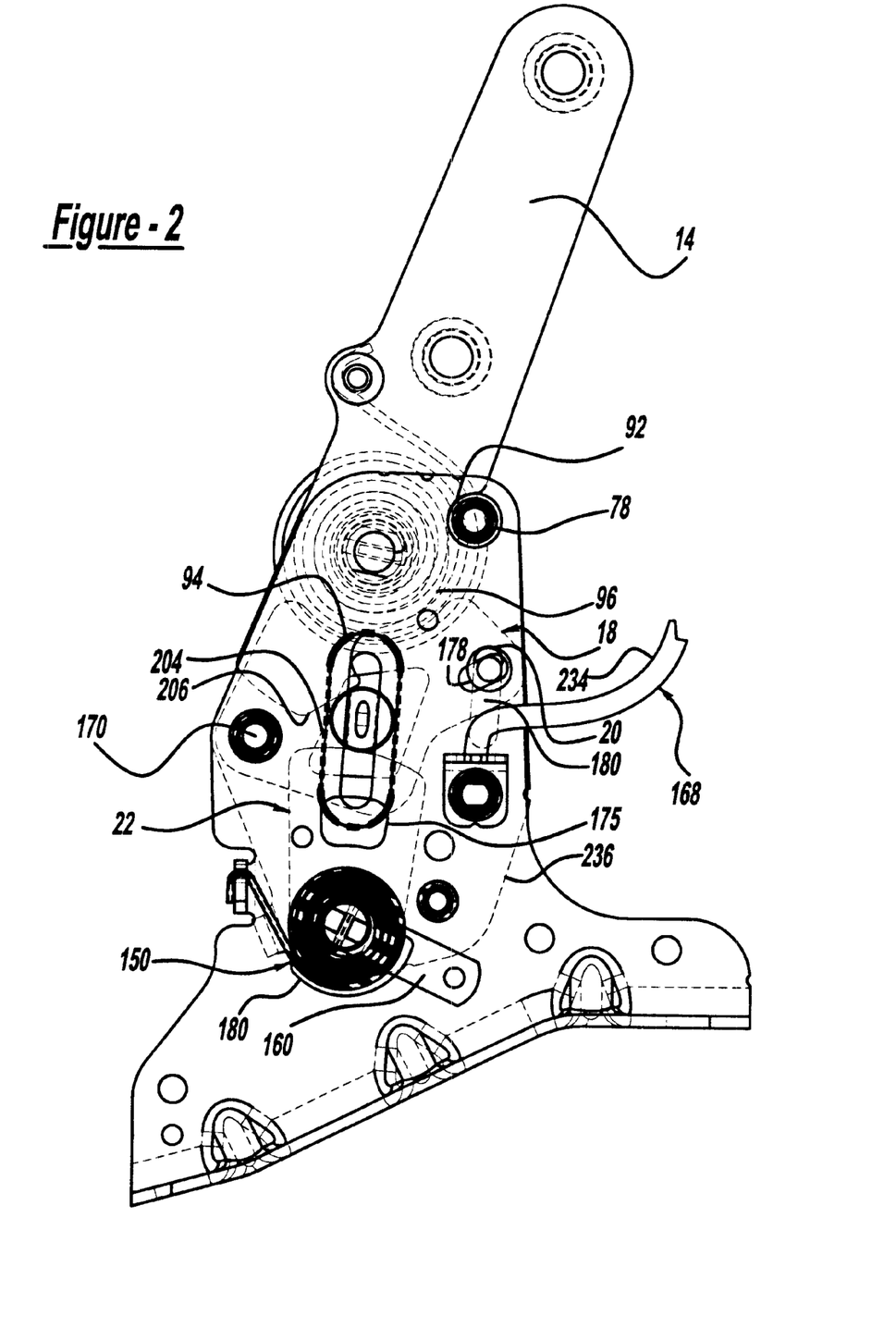
FIG. 2 is a side view of the seat hinge assembly in an upright position.
Figure 3:
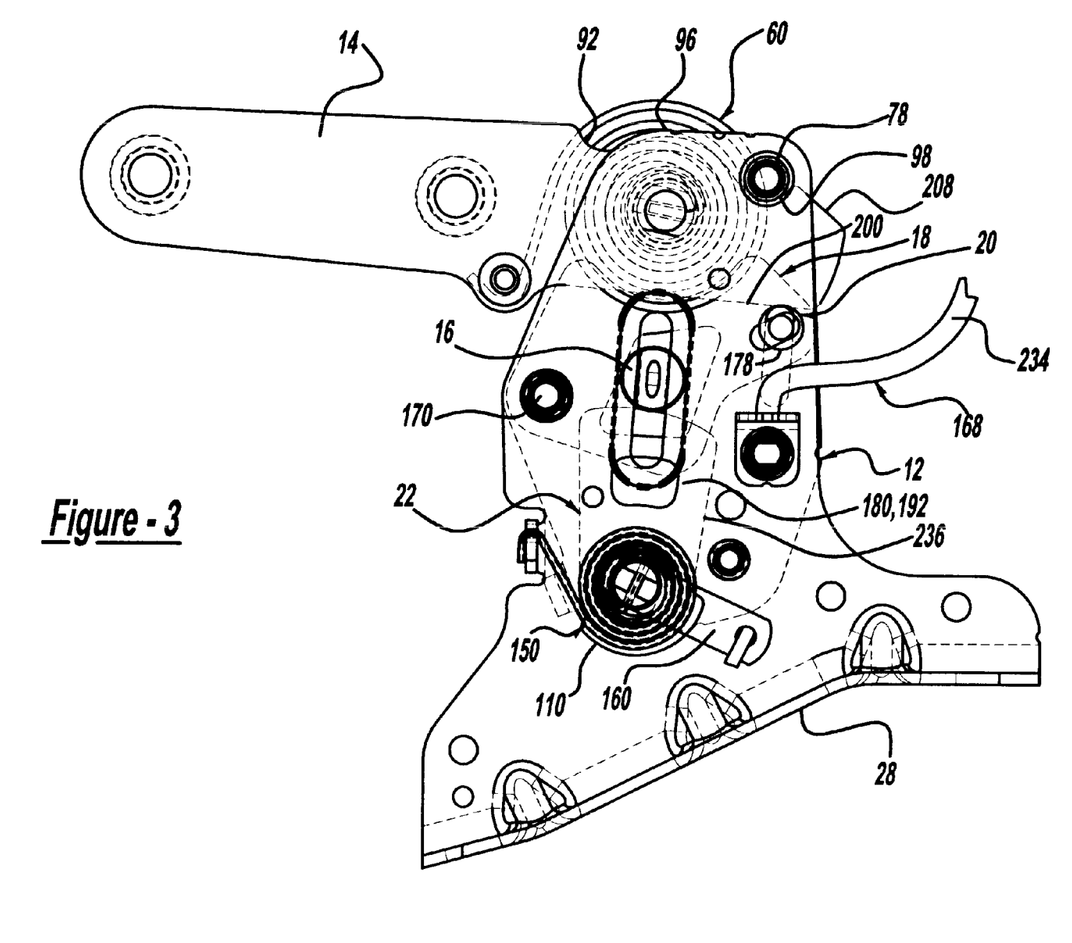
FIG. 3 is a side view of the seat hinge assembly in a fold-forward position.

With reference to FIGS. 1 through 3, the present invention provides a seat hinge assembly 10. The seat hinge assembly 10 includes a lower support member 12 that pivotally supports an arm 14. A locking arrangement is supported by the lower support member 12 and includes a lock pin 16, a lock plate arrangement 18 and a dump lock rivet 20 for locking the arm 14 in either an upright or a fold-forward position. The lock pin 16 and dump lock rivet 20 are operatively connected to a cam 22 for selectively engaging the arm 14.

The lower support member 12 includes inner and outer plates 24,26. The inner plate 24 includes an expanded base portion having an attachment plate 28 extending perpendicularly therefrom. The attachment plate 28 enables the seat hinge assembly 10 to be rigidly attached to an external structure, as described in further detail hereinbelow.

A main pivot 30 is supported between the inner and outer plates 24,26 for rotatably supporting the arm 14. The main pivot 30 includes a first cylindrical portion 32 having a groove 34 extending through its diameter and along its length. A second cylindrical portion 36 coaxially flanks the first cylindrical portion 32 and is generally of larger diameter than the first cylindrical portion 32. The second cylindrical portion 36 includes a circumferential bearing surface 38. Adjacent the second cylindrical portion 36 is a radially extending disk 40 having a third cylindrical portion 42 coaxially extending therefrom. The third cylindrical portion 42 includes a circumferential bearing surface 44. A fourth cylindrical portion 46 having a keyed face 48 coaxially flanks the third cylindrical portion 42.

The main pivot 30 is supported between the inner and outer plates 24,26 by apertures 50,52, respectively. The aperture 50 of the inner plate 24 includes a flat 54. The aperture 52 of the outer plate 26 receives the second cylindrical portion 36 therethrough and the aperture 50 of the inner plate 24 receives the fourth cylindrical portion 46 therethrough, whereby the keyed face 48 of the main pivot 30 aligns with the flat 54 of the inner plate 24. In this manner, the main pivot 30 is fixed from rotation relative the inner and outer plates 24,26. The third cylindrical portion 42 of the main pivot 30 is received through an aperture 56 of the arm 14, whereby the circumferential bearing surface 44 provides smooth rotation of the arm 14 about the main pivot 30. The third cylindrical portion 42, however, is not completely covered by the arm 14, having a portion of its length extending past the aperture 56. A spacer bushing 58 is included and is received onto the third cylindrical portion 42 to cover the remaining length of the third cylindrical portion 42. The spacer bushing 58 assists in aligning the arm 14 between the inner and outer plates 24,26 about the main pivot 30.

The arm 14 is biased in an upright position by a coil spring 60. The coil spring 60 includes a centrally disposed plate 62 that extends to form a plurality of concentric coils 64 ending in a tangentially extending curved arm 66. The centrally disposed plate 62 is received into the groove 34 of the first cylindrical portion 32 for fixing the coil spring 60 to the main pivot 30. The curved arm 66 seats against an anchor post 68 extending from the arm 14. The anchor post 68 includes a centrally disposed cylindrical portion 70 having first and second cylindrical portions 72,74 extending coaxially therefrom. The curved arm 66 of the coil spring 60 seats against the first cylindrical portion 72 and the second cylindrical portion 74 is received into an aperture 76 of the arm 14 for fixedly attaching the anchor post 68 to the arm 14.

A stop pin 78 is included for defining a range of rotational motion of the arm 14 relative to the lower support member 12. The stop pin 78 includes a centrally disposed cylindrical portion 80 having first and second cylindrical portions 82,84 coaxially extending from either side. A nylon bushing 86 is received onto the central cylindrical portion 80. The first and second cylindrical portions 82,84 are received into respective apertures 88,90 of the inner and outer support plates 24,26. The arm 14 includes upper and lower seating shoulders 92,94 interconnected by an arcuate face 96. In an upright position, the stop pin 78 seats within the upper seating shoulder 94 for prohibiting further rearward rotation of the arm 14 relative to the lower support member 12. In a fold-forward position, the stop pin 78 seats within the lower seating shoulder 94 for prohibiting further forward rotation of the arm 14 relative to the lower support member 12. As the arm 12 is caused to rotate between the upright and fold-forward positions, the arcuate face 96 slidably engages the nylon bushing 86.

A lower spacer rivet 98 is also provided and includes a main cylindrical portion 100 having first and second cylindrical portions 102,104 extending from either side. The first and second cylindrical portions 102,104 are received into apertures 106,108 of the inner and outer plates, respectively 24,26. The lower spacer rivet 98 assists in defining a distance between the inner and outer plates 24,26.

The cam 22 is rotatably supported between the inner and outer plates 24,26 by a cam pivot 110. The cam pivot 110 includes a first cylindrical portion 112 having a circumferential bearing surface 114. A radially extending disk 116 is adjacent to the first cylindrical portion 112 and has a coaxially aligned second cylindrical portion 118 extending therefrom. The second cylindrical portion 118 includes key surfaces 120 formed in its circumference. Extending from the second cylindrical portion 118 are third and fourth cylindrical portions 122,124. The third cylindrical portion 122 is generally of a smaller diameter than the second cylindrical portion 118 and includes a circumferential bearing surface 134. The fourth cylindrical portion 124 is of a slightly smaller diameter than the third cylindrical portion 122 and includes a groove 126 extending across the diameter along its entire length and key surfaces 128 formed in an end portion. The key surfaces 128 and the groove 126 produce axially extending fingers 130,132 projecting from the fourth cylindrical portion 124.

The cam 22 includes a cam surface 138 and first and second apertures 140,142 extending therethrough. The cam pivot 110 is received through the first aperture 140 of the cam 22, which includes flats 144 for alignment with the key surfaces 120 of the second cylindrical portion. In this manner, the cam 22 is fixed for rotation with the cam pivot 110. The cam pivot 110 is received in and supported by apertures 146,148 of the inner and outer plates 24,26, respectively. The apertures 146,148 of the inner and outer plates 24,26 receive the first and third cylindrical portions 112,122, respectively, whereby the circumferential bearing surfaces 114,134 enable smooth rotation of the cam pivot 110 within the apertures 146,148.

The cam pivot 110 is biased in a first rotational direction by a coil spring 150. The coil spring 150 includes a centrally disposed plate 152 that extends to form a plurality of concentric coils 154 ending in a tangentially extending curved arm 156. The centrally disposed plate 152 is received into the groove 126 of the fourth cylindrical portion 124 for fixing the coil spring 150 to the cam pivot 110. The curved arm 156 seats against a bracket 158 perpendicularly extending from the inner plate 24.

A lever 160 is fixedly attached to the cam pivot 110 for actuating the cam 22. The lever 160 includes apertures 162 disposed at a first end, separated by a cross member 164, and an aperture 166 disposed at a second end. The lever 160 is mounted onto the cam pivot 110, whereby the cross member 164 is received into the groove 126 of the fourth cylindrical portion 124 and the fingers 130,132 of the fourth cylindrical body 124 extend through the apertures 162. As will be described in further detail below, the aperture 166 of the lever 160 is connected with a cable arrangement 168 for remotely actuating the cam 22.

The lock plate arrangement 18 is pivotally supported between the inner and outer plates 24,26 about a lock plate pivot 170. The lock plate arrangement 18 includes first and second lock plates 172,174, each having a centrally disposed aperture 176 therethrough. Each lock plate 172,174 further includes a slot 178 disposed through an end opposite the lock plate pivot end. Both the lock plate arrangement 18 and the inner and outer plates 24,26 slidably support the dump lock rivet 20. The dump lock rivet 20 includes a main cylindrical portion 182 having first and second cylindrical portions 184,186 extending coaxially from either side. The main cylindrical portion 182 includes a circumferential face 188. The first and second cylindrical portions 184,186 are initially received through the slots 178 of the lock plate arrangement 18 and subsequently through slots 190,192 in the inner and outer plates 24,26, respectively. In this manner, the dump lock rivet 20 is slidable along the slots 178 of the locking arrangement 18 subject to boundaries imposed by the slots 190,192 of the inner and outer plates 24,26, and likewise, the dump lock rivet 20 is slidable along the slots 190,192 of the inner and outer plates 24,26, subject to boundaries imposed by the slots 178 of the lock plate arrangement 18.

The lock pin 16 is slidably supported between the inner and outer plates 24,26 and is received through the centrally disposed apertures 176 of the lock plates 172,174. The lock pin 16 includes a main cylindrical portion 184 having a circumferential bearing surface 196 and substantially rectangular shaped portions 198,200 extending from either side. The rectangular portions 198,200 are received into slots 202,204 of the inner and outer plates 24,26, whereby the lock pin 16 is slidable along the length of the slots 202,204. The cam surface 138 of the cam 22 slidably engages the circumferential bearing surface 196 of the lock pin 16 for selectively biasing the lock pin 16 along the slots 202,204. Further, the circumferential bearing surface 196 of the lock pin 16 slidably engages an inside edge 206 of the apertures 176 of the lock plate arrangement 18 and selectively engages an edge 208 of the arm 14 for locking the arm 14 in the upright position.

A cable mount 210 is also provided and is supported on the inner plate 24 by a cable mount rivet 212. The cable mount 210 is generally L-shaped, having first and second arms 214,216, and includes a keyed aperture 218 through the first arm 214 and a cable aperture 220 through the second arm 216. The cable mount rivet 212 includes a central cylindrical portion 222 having first and second cylindrical portions 224,226 extending therefrom. The first cylindrical body 224 includes keyed surfaces 228 along its length. The first and second cylindrical bodies 224,226 are received through apertures 230,232 of the inner and outer plates 24,26. The aperture 230 is a keyed aperture, whereby the keyed surfaces 228 of the first cylindrical portion 224 align for prohibiting the cable mount rivet 212 from rotating. The first cylindrical portion 224 extends through the aperture 230 for supporting the cable mount 210. Specifically, the first cylindrical portion 224 is received through the keyed aperture 218 of the cable mount 212, fixing the cable mount 212 from rotation.

The cable arrangement 168 includes a cable housing 234 and a cable 236 slidable within the cable housing 234. An end of the cable housing 234 is retained by the cable mount 210 through the cable aperture 220 of the second arm 216. The cable 236 extends downward therefrom and is connected to the lever 160, at aperture 166, for selectively pulling the lever 160 against the biasing force of the coil spring 150. In this manner, the cable arrangement 168 enables remote activation of the seat hinge assembly 10.

In the upright position, the arm 14 is prohibited from forward rotation by the lock pin 16, which is biased into engagement with the edge 208 by the cam 22. Also, the arm 14 is prohibited from rearward rotation by the stop pin 78 seated within the upper seating shoulder 92. To enable forward rotation of the arm 14, the cam 22 is rotated in a counterclockwise direction, relative to the views shown in FIGS. 2 and 3. Rotation of the cam 22 enables the lock pin 16 to slide downward between the slots 202,204, thereby disengaging from the edge 208 of the arm 14 and relieving biasing force against the inside edge 206 of the aperture 176. In this manner, the lock plate arrangement 18 rotates clockwise about the lock plate pivot 170 as gravity acts to pull the lock plate arrangement 18 downward. As a result, the dump lock rivet 20 travels downward along the slots 190,192 of the inner and outer plates 24,26 and the slots 178 of the lock plate arrangement 18. With the lock pin 16 disengaged from the edge 208 of the arm 14, the arm 14 is free to rotate forward, against the biasing force of the coil spring 60.

As the arm 14 rotates forward, the arcuate face 96 of the arm 14 slides along the bearing surface 86 of the stop pin 78 until the stop pin 78 seats within the lower seating shoulder 94, thereby prohibiting further forward rotation of the arm 14. The biasing force of the coil spring 150 urges the cam 22 in a clockwise direction, whereby the cam surface 138 acts upon the lock pin 16 causing the lock pin 16 to slide upward along the slots 202,204. As the lock pin 16 slides upward within the slots 202,204, it engages the inside edge 206 of the aperture 176 of the lock plate arrangement 18. In this manner, the lock plate arrangement 18 is caused to rotate counter-clockwise about the lock plate pivot 170. As a result, the dump lock rivet 20 slides upward along the slots 190,192 until the circumferential surface 188 of the main cylindrical body 182 contacts a front edge 240 of the arm 14, thereby prohibiting rearward rotation of the arm 14. In the fold forward position, a downward load may be applied to the arm 14 without effecting the components of the locking arrangement. The stop pin 78 prohibits any further forward rotation of the arm 14 that would otherwise result from the load, thereby ensuring the internal components of the seat hinge assembly 10 remain static. Further, the lock pin 16 is prohibited form upward travel within the slots 202, 204 by engagement with the inside edge 206 of the aperture 176. This avoids any binding of the internal components which could otherwise occur.

To enable rearward rotation of the arm 14, the lever 160 is again actuated to rotate the cam 22 in a clockwise direction, thereby enabling the lock pin 16 to slide downward along the slots 202,204. The lock plate arrangement pivots clockwise and the dump lock rivet 20 falls out of engagement with the front edge 240 of the arm 14. The arm 14 is then caused to rotate rearward by the biasing force of the coil spring 60, until the arm 14 again achieves an upright position.

Figure 4:
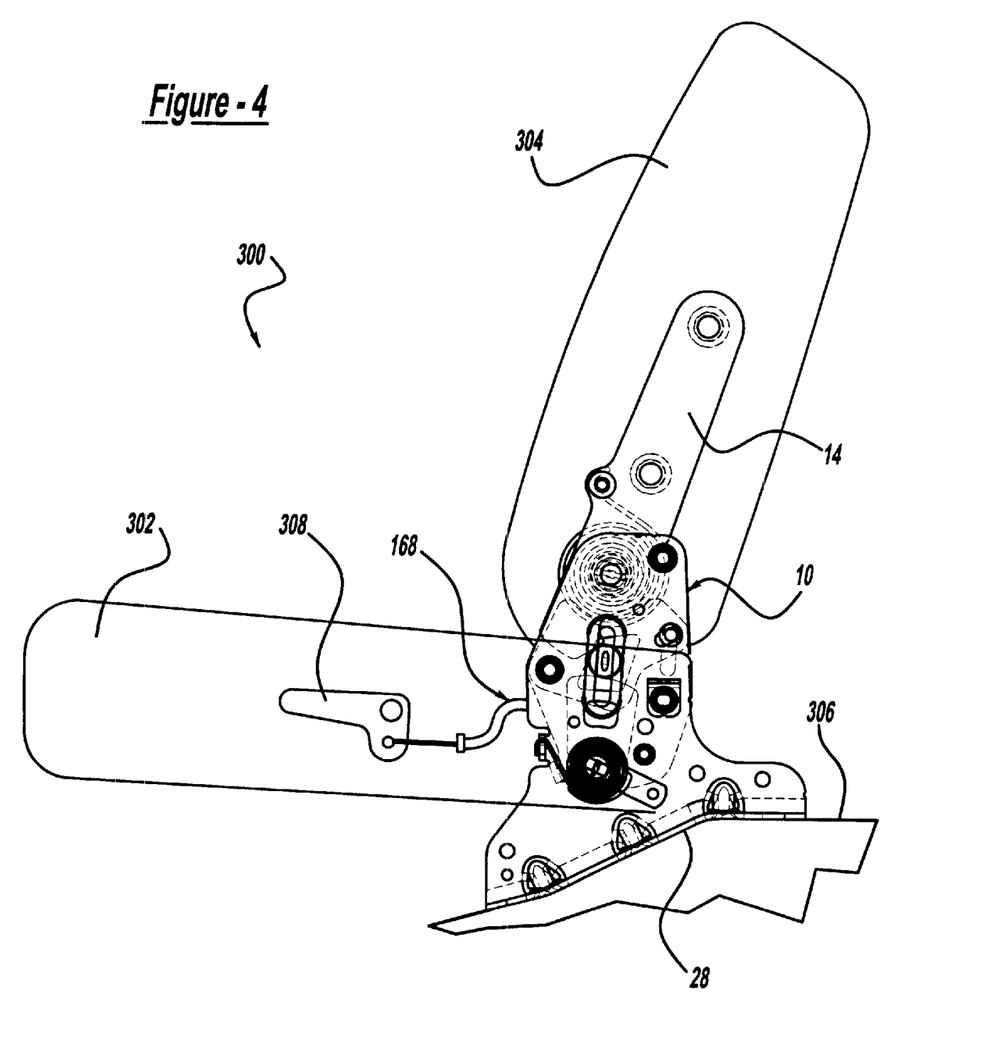
FIG. 4 is a schematic view of a seat assembly implementing the seat hinge assembly of the present invention.

With particular reference to FIG. 4, a seat assembly 300 is shown. The seat assembly 300 includes a seat 302, a seatback 304 and incorporates the seat hinge assembly 10 of the present invention. The seatback 304 is mounted to and supported by the arm 14. The seat hinge assembly 10 is fixedly attached to an external support structure 306, such as a vehicle floor, by the attachment plate 28. A remote handle 308 is also included and is connected to the cable arrangement 168 for remotely actuating the seat hinge assembly 10. Actuation of the seat hinge assembly 10 enables the seat 304 to be selectively positioned in either an upright position or a forward dump position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A seat hinge assembly, comprising:
   a support;
   an arm pivotally supported by said support for rotation relative said support;
   a lock plate pivotally supported by said support;
   a lock pin slidably supported by said support and interfacing said lock plate; and
   a lock rivet slidably supported by both said support and said lock plate;
   said lock plate movable between a first position and a second position, said lock plate in said first position positioning said lock pin to selectively block rotation of said arm when said arm is in a first orientation relative to said support and said lock plate in said second position positioning said lock rivet to selectively block rotation of said arm when said arm is in a second orientation relative to said support.

2. The seat hinge assembly of claim 1, further comprising a cam pivotally supported by said support and operably interfacing said lock plate.

3. The seat hinge assembly of claim 2, wherein said cam is biased into engagement with said lock pin by a coil spring.

4. The seat hinge assembly of claim 2, further comprising a cable assembly operably attached to said cam to remotely actuate said cam.

5. The seat hinge assembly of claim 1, wherein said lock pin concurrently engages said arm and said lock plate to lock said arm in said first orientation.

6. The seat hinge assembly of claim 1, wherein said lock pin engages said lock plate to bias said lock rivet into engagement with said arm to selectively lock said arm in said second orientation.

7. The seat hinge assembly of claim 1, wherein said support comprises inner and outer support plates.

8. The seat hinge assembly of claim 1, wherein said lock pin is received through an aperture through said lock plate to interface said lock plate.

9. The seat hinge assembly of claim 1, wherein said support further includes a stop pin in dynamic engagement with said arm to define a range of motion of said arm relative to said support.

10. The seat hinge assembly of claim 1, wherein said arm is rotatively biased relative to said support by a coil spring.

11. A seat hinge assembly, comprising:
    a support;
    an arm pivotally supported by said support;
    a lock plate pivotally supported by said support;
    a first pin and a second pin slidably supported by said support and interfacing said lock plate, said first pin concurrently engaging said arm and said lock plate to block movement of said arm when said arm is in a first position relative to said support and said first pin engaging said lock plate to bias said second pin into engagement with said arm to block movement of said arm when said arm is in a second position relative to said support.

12. The seat hinge assembly of claim 11, further comprising a cam pivotally supported by said support and slidably interfacing said first pin.

13. The seat hinge assembly of claim 12, wherein said cam is biased into engagement with said first pin by a coil spring.

14. The seat hinge assembly of claim 12, further comprising a cable assembly operably attached to said cam to remotely actuate said cam.

15. The seat hinge assembly of claim 11, wherein said second pin is further slidably supported by said support.

16. The seat hinge assembly of claim 15, wherein said first pin is received through an aperture of said lock plate to interface said lock plate.

17. The seat hinge assembly of claim 16, further comprising a third pin supported by said support and in dynamic engagement with said arm to define a range of motion of said arm relative to said support.

18. The seat hinge assembly of claim 11, wherein said arm is biased relative to said support by a coil spring.

19. A seat assembly comprising:
- a seat;
- a seat back;
- a seat hinge supporting said seat and seat back, and further comprising:
  - a support disposed within said seat;
  - an arm pivotally supported by said support and supporting said seat back for rotation relative said seat;
  - a lock plate pivotally supported by said support;
  - a first pin and a second pin slidably supported by said support and interfacing said lock plate, said first pin selectively blocking movement of said arm when said arm is in a first position relative to said support and said second pin selectively blocking movement of said arm when said arm is in a second position relative to said support.

20. The seat assembly of claim 19, further comprising an actuator interconnected to said first pin for selectively unblocking movement of said arm from said first and second positions.

21. The seat assembly of claim 20, wherein said actuator includes a cam pivotally supported by said support and slidably interfacing said first pin.

22. The seat hinge assembly of claim 19, wherein said cam is biased into engagement with said first pin by a coil spring.

23. The seat hinge assembly of claim 19, further comprising a cable assembly operably attached to said cam to remotely actuate said cam.

24. The seat hinge assembly of claim 19, wherein said first pin concurrently engages said arm and said lock plate to lock said arm in said first position.

25. The seat hinge assembly of claim 19, wherein said first pin engages said lock plate to bias said second pin into engagement with said arm for selectively locking said arm in said second position.

26. The seat hinge assembly of claim 19, wherein said first pin is received through an aperture of said lock plate for interfacing said lock plate.

27. The seat hinge assembly of claim 19, further comprising a third pin supported by said support and in dynamic engagement with said arm to define a range of motion of said arm relative to said support.

28. The seat hinge assembly of claim 19, wherein said arm is biased relative to said support by a coil spring.

* * * * *